US011200551B2

(12) United States Patent
Hegge et al.

(10) Patent No.: US 11,200,551 B2
(45) Date of Patent: Dec. 14, 2021

(54) SYSTEM FOR FACILITATING REAL-TIME TRANSACTIONS

(71) Applicant: MASTERCARD PAYMENT SERVICES DENMARK A/S, Copenhagen (DK)

(72) Inventors: Jon Arne Hegge, Oslo (NO); Espen Dasvand, Olso (NO); Leif John Korshavn, Oslo (NO); Marius Hoy, Kristiansand (NO)

(73) Assignee: MASTERCARD PAYMENT SERVICES DENMARK A/S, Copenhagen (DK)

( * ) Notice: Subject to any disclaimer, the term of this patent is extended or adjusted under 35 U.S.C. 154(b) by 80 days.

(21) Appl. No.: 16/311,284

(22) PCT Filed: Jun. 23, 2017

(86) PCT No.: PCT/EP2017/065539
§ 371 (c)(1),
(2) Date: Dec. 19, 2018

(87) PCT Pub. No.: WO2017/220779
PCT Pub. Date: Dec. 28, 2017

(65) Prior Publication Data
US 2019/0333035 A1 Oct. 31, 2019

(30) Foreign Application Priority Data
Jun. 23, 2016 (EP) .................................... 16176072

(51) Int. Cl.
*G06Q 20/16* (2012.01)
*G06Q 20/40* (2012.01)

(52) U.S. Cl.
CPC ........... *G06Q 20/16* (2013.01); *G06Q 20/405* (2013.01)

(58) Field of Classification Search
CPC .... G06F 16/245; G06F 16/254; G06F 16/282; G06F 16/285; G06F 16/9535;
(Continued)

(56) References Cited

U.S. PATENT DOCUMENTS 5,793,846 A * 8/1998 Katz .................... G07C 15/005
379/127.01
5,875,440 A * 2/1999 Cooperman ........... G06N 5/022
706/50

(Continued)

OTHER PUBLICATIONS

International Search Report from PCT Application No. PCT/EP2017/065539, dated Sep. 8, 2017.
(Continued)

*Primary Examiner* — Scott S Trotter
*Assistant Examiner* — Slade E Smith
(74) *Attorney, Agent, or Firm* — Workman Nydegger

(57) ABSTRACT

A system for facilitating real-time transactions of data representing monetary value between clients in a computer network comprises at least one first client and a transaction server computer system, the first client being associated with a set of data representing a balance of monetary value. The transaction server computer system is configured for receiving requests for transactions of data representing an amount of monetary value from a plurality of second clients for real-time updates of the first client's set of data. The first client's set of data is stored in a data structure comprising first and second subsets of the data, each subset of data defining a sub-balance representing an amount of monetary value. The first and second subsets are simultaneously updated following respective requests. A server architecture comprising a further administrative authority server computer system and secure tunnels enhances security.

12 Claims, 10 Drawing Sheets

(58) Field of Classification Search
CPC ........ G06F 9/505; G06F 16/972; G06F 9/465;
G06F 9/5077; G06Q 10/0637; G06Q
10/1093; G06Q 20/22; G06Q 20/02;
G06Q 20/10; G06Q 20/16; G06Q 20/202;
G06Q 20/3829; G06Q 20/40; G06Q
20/4016; G06Q 20/405; G06Q 40/02;
H04L 47/10; H04L 63/062; H04L 63/068;
H04L 67/02; H04L 67/303
USPC .......................................................... 705/39
See application file for complete search history.

(56) References Cited

U.S. PATENT DOCUMENTS

| | | | | |
|---|---|---|---|---|
| 6,038,647 | A * | 3/2000 | Shimizu | G06F 12/0846 711/129 |
| 6,055,539 | A * | 4/2000 | Singh | G06F 16/9027 |
| 6,067,313 | A * | 5/2000 | Cafarella | H04J 13/004 375/130 |
| 6,073,218 | A * | 6/2000 | DeKoning | G06F 9/52 710/20 |
| 6,084,688 | A * | 7/2000 | Stumbo | G06K 15/00 358/1.16 |
| 6,088,511 | A * | 7/2000 | Hardwick | G06F 8/45 345/423 |
| 6,098,881 | A * | 8/2000 | DeLand, Jr. | G06K 7/087 235/380 |
| 6,122,639 | A * | 9/2000 | Babu | H04L 12/12 |
| 6,196,466 | B1 * | 3/2001 | Schuessler | H03M 7/08 235/462.1 |
| 6,212,526 | B1 * | 4/2001 | Chaudhuri | G06F 16/285 |
| 6,216,139 | B1 * | 4/2001 | Listou | G06F 40/177 715/209 |
| 6,233,286 | B1 * | 5/2001 | Wei | H04L 25/03235 375/260 |
| 6,571,282 | B1 * | 5/2003 | Bowman-Amuah | H04L 67/303 709/219 |
| 6,578,068 | B1 * | 6/2003 | Bowman-Amuah | G06F 9/465 709/203 |
| 7,231,376 | B1 * | 6/2007 | Gurtuna | G06N 20/00 706/12 |
| 7,246,035 | B1 * | 7/2007 | Palit | G06F 17/18 702/179 |
| 9,710,801 | B2 * | 7/2017 | Aadi | G06Q 20/14 |
| 10,248,964 | B1 * | 4/2019 | Neemann | G06Q 30/0233 |
| 2003/0140007 | A1 * | 7/2003 | Kramer | G06Q 20/04 705/40 |
| 2003/0154112 | A1 * | 8/2003 | Neiman | G06F 9/5044 705/5 |
| 2003/0182230 | A1 * | 9/2003 | Pessin | G06Q 40/025 705/39 |
| 2004/0073530 | A1 * | 4/2004 | Stringer-Calvert | G06F 16/27 |
| 2004/0133622 | A1 * | 7/2004 | Clubb | G06Q 40/02 709/200 |
| 2008/0109493 | A1 * | 5/2008 | Zaifman | G06F 16/24556 |
| 2010/0057502 | A1 * | 3/2010 | Arguelles | G06Q 50/265 705/5 |
| 2010/0153451 | A1 * | 6/2010 | Delia | G06Q 20/40 707/781 |
| 2010/0153740 | A1 * | 6/2010 | Dodgson | G06F 11/2061 713/189 |
| 2010/0293108 | A1 * | 11/2010 | Gurvitch | G06Q 40/04 705/36 R |
| 2010/0312814 | A1 * | 12/2010 | Jensen | G06Q 40/06 709/201 |
| 2011/0022812 | A1 * | 1/2011 | van der Linden | H04L 67/1097 711/163 |
| 2011/0119119 | A1 * | 5/2011 | Sosikian | G06Q 30/04 705/14.7 |
| 2011/0145315 | A1 * | 6/2011 | Walker | G06F 16/972 709/203 |
| 2011/0246434 | A1 * | 10/2011 | Cheenath | G06F 16/2386 707/703 |
| 2012/0209762 | A1 * | 8/2012 | Metaireau | G06Q 20/3223 705/39 |
| 2012/0290478 | A1 * | 11/2012 | Crofts | G06Q 40/00 705/44 |
| 2012/0316961 | A1 * | 12/2012 | Evans | G06F 21/6218 705/14.53 |
| 2013/0144783 | A1 * | 6/2013 | Bishop | G06Q 20/10 705/42 |
| 2013/0282542 | A1 * | 10/2013 | White | G06Q 40/00 705/35 |
| 2014/0006283 | A1 * | 1/2014 | Hogg | G06Q 20/384 705/44 |
| 2014/0006297 | A1 * | 1/2014 | Hogg | G06Q 10/101 705/319 |
| 2014/0180790 | A1 * | 6/2014 | Boal | G06Q 30/0251 705/14.42 |
| 2014/0250054 | A1 * | 9/2014 | Jones | G06F 16/254 707/602 |
| 2014/0344150 | A1 * | 11/2014 | Kapur | G06Q 20/10 705/44 |
| 2014/0344326 | A1 * | 11/2014 | Kamath | G06F 9/5088 709/203 |
| 2015/0242479 | A1 * | 8/2015 | Cheenath | G06F 16/273 707/615 |
| 2015/0277964 | A1 * | 10/2015 | Atkins | G06F 11/3433 718/101 |
| 2015/0302384 | A1 * | 10/2015 | Aadi | G06Q 20/14 705/40 |
| 2015/0363603 | A1 * | 12/2015 | Hsu | G06F 16/9535 707/783 |
| 2016/0035044 | A1 | 2/2016 | Xu | |
| 2016/0191509 | A1 * | 6/2016 | Bestler | G06F 12/1408 713/163 |
| 2017/0199922 | A1 * | 7/2017 | Gardner | G06F 16/2379 |
| 2017/0212731 | A1 * | 7/2017 | Beck | G06F 3/04842 |
| 2019/0156338 | A1 * | 5/2019 | Salama | G06Q 20/34 |

OTHER PUBLICATIONS

European Search Report from EP Application No. 16176072, dated Dec. 7, 2016.
"Multi-core processor", Wikipedia, Jun. 22, 2016, 14 pages, Retrieved from https://en.wikipedia.org/w/index.php?title=Multi-core_processor&oldid=7264 7 4411 #Software_effects.

* cited by examiner

SYSTEM FOR FACILITATING REAL-TIME TRANSACTIONS

FIELD OF THE INVENTION

The present invention relates to a system for facilitating real-time transactions of data representing monetary value between clients in a computer network, and in particular to network and server architecture enabling fast and secure execution of high numbers of such transactions within short time frames.

BACKGROUND OF THE INVENTION

The evolution of communications infrastructure, including the Internet and mobile telecommunications systems has resulted in the development of new platforms for effecting monetary transactions. The number of non-cash payments is steadily increasing, credit card transactions being effected not only via credit card terminals but also via Internet service such as PayPal®, smartphone applets, or similar systems. Still today, however, transactions are often not effected immediately, i.e. real-time, but with a delay of, typically, one banking day. Frequently, data representative of transactions are collected centrally within IT systems of banks, card suppliers or other entities throughout a certain period of time, such as one day, following which net amounts of monetary value are transferred between bank accounts, possibly through an intermediary authority, such as a central bank or other trusted party.

The present invention is concerned with a system allowing transactions between consumers, businesses and banks to be effected real-time. Embodiments of the invention seek to bring about a network and server architecture enabling fast and secure real-time execution of high numbers of monetary transactions.

SUMMARY OF THE INVENTION

In a first aspect, embodiments provide a system for facilitating real-time transactions of data representing monetary value between clients in a computer network comprising at least one first client and a transaction server computer system, the first client being associated with a set of data representing a balance of monetary value, the set of data being stored in the transaction server computer system, wherein the transaction server computer system is configured for receiving requests for transactions of data representing an amount of monetary value, via the computer network, from a plurality of second clients for real-time updates of the first client's set of data, and wherein the transaction server computer system is configured to:
store the first client's set of data in a data structure, wherein the data structure comprises at least a first subset of the first client's set of data and a second subset of the first client's set of data, each subset of data defining a sub-balance representing an amount of monetary value;
reserve each of the first and second subsets of data for a respective first and second one of the requests upon receipt of the requests;
update the first subset of data in accordance with the first request, and simultaneously update the second subset of data in accordance with the second request.

By dividing the set of data representing the balance of monetary value into first and second subsets and by updating the first and second subsets simultaneously, it is achieved that two of the requests for update of the set of data can be processed in parallel, i.e. at the same time. Thus, transaction speed is improved, and more updates per unit of time may thus be performed. The update of the first client's subset of data may in particular reside in drawing of monetary value from the first client's set of data to reduce the balance of monetary value represented thereby. For example, the request for a transaction may reside in a request from one of the second clients to transfer or wire an amount of monetary value from the set of data to a further set of data representing a monetary balance of the requesting second client. In one embodiment of the invention, each request for transactions is compared to the balance of each subset of data to ensure that the amount of monetary value to be drawn does not exceed the sub-balance of the subset of the set of data to which the request in question is designated. Alternatively or additionally, the transaction server computer system may be configured to decline a request in case the amount to be drawn exceeds the available balance of the set of data.

Further, increase in transaction speed may be achieved without changing the computer hardware configuration of the system for transactions. This has several tangible effects in the physical world outside the bits and bytes of a computer system. Firstly, embodiments of the invention may handle the same number of transactions as systems known in the art, but with significantly less computing power. Accordingly, embodiments of the present invention may decrease the demand on hardware. Further, by more efficient handling of the requests for transactions and updates, the energy consumption may be reduced by embodiments of the invention further reducing the demand on resources.

Clients may include computer networks of monetary institutions such as banks. The computer networks of the monetary institutions may comprise at least one secured gateway, such as a firewall, for establishing secured data communication gateways. Such secured data communication gateways are advantageously situated between the computer networks of the clients and any external computers. In case the clients are banks, the transactions of data representing monetary value happen between banks. Such transactions may be referred to as bank to bank transfers.

The plurality of second clients may receive requests for transactions from external clients. Such external clients may be computers on an external network such as the internet. The computers may be operated by the second clients' costumers being e.g. individual persons or companies. The transactions may also be generated from computers within the computer network of third party money handlers specialized in facilitating money transfers. The requests for transactions may also be generated within the computer networks of the individual second clients.

The transaction server computer system may be a central server, e.g. at regional, national or supranational level, administered by a trusted third party, such as a central bank. Alternatively it may be a further party trusted by the monetary institutions and a central bank. As another alternative, the transaction server computer may solely be the further party trusted by the monetary institutions.

In addition to the transaction server computer system, embodiments of the system according to the present invention may comprise an administrative authority computer system. In such embodiments, the first client may have an account defining a real balance of monetary value within the administrative authority computer system, and this account may be mirrored on the first client's set of data stored in the transaction computer system. In the present context, mirroring the account on the set of data should be understood as comparing or equating the balance of real money defined by the account with the balance of monetary value represented by the set of data. Such mirroring may be carried out so that the balance of real money is equal to or at least as large as the monetary value represented by the set of data.

By performing the update in accordance with the requests for transactions at the mirrored set of data, latency delays caused by update of the real balance of the accounts of the monetary institutions at the administrative authority computer system may be reduced or avoided. Accordingly, by mirroring the real data and the set of data at the transaction server computer system, a further increase of transaction speed may be achieved. Update of the real balance may be performed intermittently, i.e. after a certain number of requests has been processed by the transaction server computer system, thus causing latency delays only of updates of the real balances which need to occur only at intervals of, e.g., six hours, one hour or 15 minutes. The intervals may also be defined by accumulated transaction amounts, the number of transactions carried out, etc.

Similarly, the first client's account in the administrative authority computer system may be mirrored on the first client's set of data only at given intervals. Mirroring of the account on to the set of data should preferably be carried out in order to ensure that the real balance at the administrative authority server computer system adequately reflects the balance represented by the set of data, as updated according to the requests, at the transaction server computer system. As such, mirroring is preferably performed in relation to update of the real balance defined by the account. The step of mirroring may form part of the invention as claimed herein, or may be performed by a software component connected to the system according to the invention.

In present context, the term real-time transactions refer to transactions that are processed as they are received. As a consequence, requests for updates of data representing monetary value are not accumulated over time and subsequently processed in bundles of accumulated requests, but rather the requests are individually processed by the transaction server computer system, preferably one by one. In this way, each request for update of data representing monetary value may cause the set of data to be updated and the balance represented by the set of data to change. Real-time transactions may also be referred to as instant payments.

The data structure of the transaction server computer system, wherein the first client's set of data is stored, comprises at least the first subset of the first client's set of data and the second subset of the first clients set of data. The data structure may also comprise a larger number of subsets of data such as, e.g. three, four, five, eight, ten, 15 or 20. The amount of monetary value represented by the accumulated sub-balances of the subsets of data may be equal to the monetary value represented by the set of data. The data structure wherein the first client's set of data is stored may be physically stored in a memory of a single server computer or at least two server computers of the transaction server computer system.

In the embodiment as above, when the transaction server computer system receives a plurality of requests for updates of the first client's set of data, the transaction server computer system reserves the first subset of data for the first one of the requests and reserves the second subset of data for the second one of the requests. The reserved first and second subsets of data are preferably unavailable for update in accordance with any request other than the request they are reserved for. By reserving a subset of data for a particular request for update, it is ensured that the reserved subset of data is only updated in accordance with one of the requests at a time. The transaction server computer system may be configured to determine if the envisaged update of the reserved subset of data will cause the sub-balance represented by the reserved subset of data to become negative. In this case, it may be determined at the point in time when a subset is reserved for the first or second one of the requests, if the update in response to the first or second one of the requests should be allowed. It is then possible to notify the sender of the first or second request, i.e. the second client, if the transaction is allowable or if it will be rejected even before the set of data is updated.

After the first subset of data has been reserved for update according to the first one of the requests and the second subset of data has been reserved for update according to the second one of the requests, the first and second subsets of data are updated simultaneously. The simultaneous update of the first and second subsets of data may allow the first client's set of data to be updated in response to more than one request at a time. As also described above, this will increase the rate at which requests for update of the first client's set of data is able to be processed by the system. Once either one of the first or second subset of data has been updated there is no longer need for the respective subset of data to be reserved. Accordingly, a subset of data may be released once it has been updated so that it is available for further updates.

The transaction server computer system may be configured to update more than one subset of data in accordance with a single request for update of the first clients set of data.

The computer network may comprise a plurality of first clients, each first client being associated with a respective set of data.

The transaction server computer system may comprise:
a first processing unit for processing receipt of the requests for transactions; and
a second processing unit for reserving each of the first and second subsets of data for the respective first and second ones of the requests upon receipt of the requests, and for updating the first subset of data in accordance with the first request, and for simultaneously updating the second subset of data in accordance with the second request;
wherein the first processing unit is further configured to instruct the second processing unit to store the first client's set of data in the data structure, reserve each of the first and second subsets of data for the respective first and second ones of the requests upon receipt of the requests, and to update the first subset of data in accordance with the first request, and to simultaneously update the second subset of data in accordance with the second request.

The dedicated first and second processing units allow for parallel processing of handling of receipt of requests by the first processing unit and updating first and second subsets of data by the second processing unit enabling overcoming of potential bottlenecks, and consequently more updates per unit time may be achieved. More specifically, this may allow the first processing unit to handle receipt of requests even if the second processing is fully or almost fully occupied by updating the first and second subsets of data. Similarly, this may allow the second processing unit to update the first and second subsets of data even if the first processing unit is fully or almost fully occupied handling receipt of requests.

Further, such embodiments allow the first processing unit and the second processing unit to be configured to have individual computing capacities and possibly to have computing capacities chosen so as to optimize the work load balancing between the first and second processing units. This allows the transaction server computer system to be further optimized in way that minimizes the amount of time the first processing unit may have to wait for the second processing unit to finish and vice versa.

The first processing unit and second processing units are preferably separate CPUs or separate CPU cores.

The second processing unit may be a parallel processing unit comprising multiple cores in a single CPU or multiple CPUs. This allows for parallel processing of multiple subsets of data simultaneously on individual CPUs or CPU cores enabling more updates per unit time to be achieved.

Each of the subsets of data may be processed at a dedicated one of the CPUs or CPU cores of the parallel processing unit, so that each subset of data is processed by one of the processors or processor cores different from any other one of the processors or processor cores. In this case, each of the CPUs or CPU cores is preferably dedicated to process a single subset of data. Accordingly, processing of each subset of data may be performed with little or no impact on the processing of other subsets of data. This may further increase the number of updates per unit time achieved.

The transaction server computer system may be configured to determine, upon receipt of a third one of the requests, if the first and second subsets of data are reserved, and in the affirmative, perform an update of the set of data according to a predefined auxiliary updating scheme. In this case, the transaction server computer is configured to handle the case when the third one of the requests for update of the first client's set of data is received before updates according to the first and second one of the requests are completed.

The predefined auxiliary updating scheme may be to store the third one of the requests and to determine if the first and second subsets of data are reserved at predefined intervals in time. The predefined intervals in time may be on, e.g. the microsecond scale, millisecond scale or second scale. The transaction server computer system may then continue to determine if the first and second subsets of data are reserved until at least one of the first and second subsets of data is not reserved. At this point, the at least one of the unreserved subsets of data is reserved for the third one of the requests.

In case the data structure comprises three subsets of data, the predefined auxiliary updating scheme may be to determine if the third subset of data is reserved. If the third subset of data is not reserved, the third subset of data may be updated according to the third request. If the third subset of data is reserved and in case the data structure comprises four subsets of data, the predefined updating scheme may be to determine if the fourth subset of data is reserved. This auxiliary updating scheme may be applied in systems wherein the data structure comprises any number of subsets of data larger than two. In this case, the system is potentially able to simultaneously process as many requests for update of the first client's set of data as the number of subsets of data the data structure comprises.

The transaction server computer system may be configured to:
determine, upon reservation of the first subset of data for one of the requests, if an envisaged update of the reserved subset of data in response to that request would cause the sub-balance of the reserved subset of data to become negative;
if it is determined that the sub-balance of the reserved subset of data would become negative: divide the request into a first set of a plurality of sub-requests, reserve the second subset of data, and update the first and second subsets of data simultaneously in accordance with the plurality of sub-requests.

In this case, the request may be processed by the system even if the amount of monetary value represented by the data to be transferred exceeds the amount of monetary value represented by the sub-balance of the reserved subset of data. According to this embodiment, each sub-request of the first set of sub-requests is for transaction of data representing a sub-amount of monetary value. The accumulated sub-amounts of the sub-requests are equal to the amount of monetary value represented by the data requested to be transferred by the request, from which the sub-requests are derived. Accordingly, the request is split between the first subset of data and the second subset of data. In case the data structure comprises more than two subsets of data, more than two subsets of data may be reserved and then updated simultaneously in accordance with the plurality of sub-requests.

The transaction server computer system may be configured to:
determine the sub-balances of a plurality of subsets of data in response to receipt of one of the requests;
simultaneously reserve a number of subsets of data defining sub-balances large enough for the accumulated sub-balances of the reserved subsets of data to be at least as large as the amount of monetary value represented by the data requested to be transferred;
divide the request into a second set of sub-requests, the number of sub-requests in the second set of sub-requests being equal to the number of reserved subsets of data;
update the reserved subsets of data simultaneously in accordance with the second set of sub-requests.

In this case, the request may be processed by the system even if the amount of monetary value represented by the data to be transferred exceeds the amount of monetary value represented by the sub-balance of any one of the subsets of data. Furthermore, because the number of subsets of data necessary to process the request without any one of the sub-balances becoming negative is reserved simultaneously, it may be ensured that if any subset of data is reserved for the request, all the subsets of data necessary for processing the request are reserved. Accordingly, it may be avoided that any one of the subsets of data is reserved for the request without the request being able to be processed.

According to this embodiment, each sub-request of the second set of sub-requests is for transaction of data representing a sub-amount of monetary value. Also, the accumulated sub-amounts of the sub-requests of the second set of sub-requests are equal to the amount of monetary value represented by the data requested to be transferred by the request the sub-requests are generated from. Furthermore, the request is divided into the second set of sub-requests in such a manner that each sub-amount is no larger than the sub-balance of a designated one of the reserved subsets of data.

The transaction server computer system may be configured to change the number of subsets of data stored in the data structure based on an evaluation of the number of received requests within a specified period of time.

According to this embodiment, the transaction computer system is configured to optimize the number of subsets in the data structure. In general, as the number of subsets of data in the data structure increases, the need for maintenance of the data structure increases. Moreover, for example the data integrity of each subset of data should be ensured, data communication to and from each subset of data should be possible and the first client's set of data increases in complexity with an increasing number of subset of data. On the other hand, as the number of subsets of data in the data structure increases, the number of requests the system can process simultaneously also increases. Thus, an optimum number of subsets of data in the data structure may exist and the transaction server computer system may be configured to vary the number of subsets of data on the basis of predefined or pre-set user setting, or on the basis of a determination of requests, available computational resources, such as CPU power or memory availability, computational load, etc., preferably with a view to approaching the optimum number.

The evaluation may include a comparison of the number of received requests within a specified period of time with a first threshold number and a second threshold number. In this case, if the number of received requests is larger than the first threshold number, the transaction server computer system is configured to increase the number of subsets of data. Accordingly, if the number of received requests is smaller than the second threshold number, the transaction server computer system may be configured to decrease the number of subsets of data. The first threshold number may be equal to are larger than the second threshold number. The closer the two threshold numbers are to each other, the more often the number of subsets of data is changed and the more likely it is that the number of subsets corresponds to a suitable number of subsets based on the evaluation.

The specified period of time may be a recently elapsed period of time. In this case, the number of subsets may be set (optimized) with respect to the current need for request processing. The specified period of time may alternatively be a period of time in the past, e.g. a period that ended one year ago, one month ago or one day ago. In this case, the number of subsets may be varied (optimized) in accordance with previously observed trends in request processing needs that may reoccur.

The transaction server computer system may be configured to change the number of subsets of data stored in the data structure based on an evaluation of the amount of monetary value represented by the data requested to be transferred within a specified period of time. This allows the transaction server computer, e.g. reduce the number of subset of data if first share of the requests received are for amounts larger than a first threshold amount or increase the number of subsets of data if a second share of the requests received are for amounts smaller than a second threshold amount. This may increase the number of transactions the system is able to handle per unit of time.

The transaction server computer system may be configured to:
determine the sub-balances of each of the plurality of subsets of data at predetermined intervals;
generate and populate a prioritized list of the subsets of data, wherein the prioritized list ranks the subsets or groups of the subsets according to their associated sub-balances;
select one of the subsets or groups of subsets in the prioritized list for each one of the requests on the basis of the prioritized list;
assign each of the requests to the selected subset or groups of subsets; and subsequently
update at least one of the subsets of data of the selected subset or groups of the subsets in accordance with each one of the requests.

In this case, the transaction server computer system may be able to preferentially reserve the subsets of data with the largest sub-balances in response to receipt of requests for transactions of data representing first amounts of monetary value which are larger than second amounts of monetary value of other requests. Conversely, the transaction server computer system may also be able to preferentially reserve the subsets of data with the smallest sub-balances of the subsets of data in response to receipt of requests for transactions of data representing third amounts of monetary value which are smaller than fourth amounts of monetary value of other requests. Accordingly, the number of subsets of data reserved to process a request for data representing a relative large amount of monetary value may be reduced. Furthermore, the subsets of data with the smallest sub-balances may be allowed to process requests for relatively small amounts without a few requests for relatively large amounts reserving a large number of the subsets with the smallest sub-balances. Accordingly, the amount of monetary value represented by the set of data may be reduced.

The transaction server computer system may also be able assign requests to a prioritized sequence of subsets or groups of subsets in the prioritized list. For instance, upon receipt of a request for a first amount of monetary value larger than second amounts of monetary, the transaction server computer may assign the plurality of sub-requests derived from the request to the unreserved subsets of data with the largest sub-balances at the time of reservation of subsets for the plurality of sub-requests. This may further reduce the number subsets reserved to process a request for data representing a relative large amount of monetary value may be reduced.

The second and fourth amounts of monetary value may be varied to change what subsets of data on the prioritized list are being preferentially reserved for requests representing certain amounts of monetary value. The second and fourth amounts may be varied in response to, e.g. variation in the sub-balances of the subsets of data on the prioritized list, the average amount of monetary value represented by requests received within the specified interval or the minimum and/or maximum amount of monetary value represented by requests received within the specified interval.

The specified interval according to this embodiment may be intervals defined by, e.g. the number of requests received, the accumulated request amounts, the accumulated request amounts, the number of transactions carried out, etc.

The transaction server computer system may comprise a plurality of individual data storage units, and wherein each subset of data is stored in an individual data storage unit. This may decrease the time it takes to update each subset of data because each data storage unit only has to update one subset of data at a time.

The transaction server computer system may comprise a plurality of server computers, in which case all data associated with the first client is preferably stored in a single server computer. In case this case all requests for update of the first client's set of data are sent to the single server computer. Also, the data structure and thus the subsets of data are stored in the single server computer. Accordingly, it may be avoided that communication between server computers is necessary to, e.g. determine sub-balances of the subsets of data, determine the balance of the set of data from the accumulated sub-balances of the subsets of data, update the subsets of data in accordance with the plurality of sub-requests or generate and populate the prioritized list of the subsets of data. Thus, the number of requests processed per unit of time may be increased. The single server computer may store data associated with the first client only. In this case, each server computer is dedicated a single first client even of the computer network comprises a plurality of first clients. Accordingly, each server computer only handles requests for updates of the single client's set of data. Thus, data traffic for requests for updates of a plurality of first clients' sets of data is split between a plurality of server computers and the chance of data traffic bottlenecks occurring in the system may be reduced.

The subsets of data associated with the first client may be stored on at least two server computers, in which case no set of sub-requests is processed on more than one server computer. According to this embodiment, at least the first and second subsets of data are stored on a first server computer and at least a third and fourth subset of data are stored on a second server computer. This allows the totality of requests for update of the single client's set of data to be split between at least two server computers. Accordingly, each server computer receives a smaller number of requests for update of the first client's set of data. Thus, the number of requests processed per unit of time may be increased. Furthermore, because no set of sub-requests is processed on more than one server computer, less communication between the at least two server computers may be required upon receipt of a single request.

The transaction server computer system may be configured to determine the sub-balances of all subsets of data at predefined intervals in time. Based on the determined sub-balances of all the subsets of data, the transaction server computer system may be able to determine if, e.g. sub-balances of subsets of data are different from a threshold sub-balance interval preferably have their sub-balances adjusted, the balance of the set of data is different from a threshold balance interval and preferably have the balance adjusted, etc. Accordingly, the transaction server computer system may be able to improve operation of the system.

The intervals in time may be, e.g. once every day, 12 hours, 1 hour, 30 minutes, 15 minutes, 5 minutes, 30 seconds, etc.

The transaction server computer system may be configured to issue requests for transfer of data representing an amount of monetary value between subsets of data of the first client's set of data based on at least the sub-balances of the subsets of data. In this case, the transaction server computer system may be able to vary the sub-balances of the subsets of data and possibly even out differences between the individual sub-balances of individual subsets of data. This may increase the number transactions processed per unit of time as the chance of subsets of data reaching zero or near-zero balance may be reduced.

The transaction server computer system may define at least a first and a second threshold sub-balance. In this case, if the sub-balance of the first subset of data is smaller than the first threshold sub-balance, the transaction server computer system may issue a request for transfer of data representing an amount of monetary value from the second subset of data to the first subset of data. Hereby the sub-balance of the first subset of data is increased. Conversely, if the sub-balance of the first subset of data is larger than the second threshold sub-balance, the transaction server computer system may issue a request for transfer of data representing an amount of monetary value from the first subset of data to the second subset of data. This may allow the transaction server computer system to decrease the number of subsets of data with zero or near-zero sub-balances. It may also prevent subsets of data from having unnecessarily large sub-balances. Similar functionality is readily conceivable if the data structure comprises more than two subsets of data.

The transaction server computer system may define more than two threshold sub-balances. It may for instance assign each subset of data to a group and define a different pair of first and second threshold sub-balances to each group of subsets of data. It may also define a different pair of first and second threshold sub-balances to each subset of data. Accordingly, the transaction server computer system may be able to vary the sub-balances of each subset of data or group of subsets of data to define and populate the prioritized list of subsets of data or groups of subsets of data in an enhanced manner, thus possibly increasing the number of transactions the system is able to process per unit of time.

The transaction server computer system may be configured to delete all subsets of data and create new subsets of data, the balance of each client's set of data being unaffected in the process. In this case, the transaction server computer system may be able to vary the sub-balances of some or all subsets of data without issuing requests for transactions between the subsets of data. The balance of the set of data may be divided into the sub-balances of the new subsets of data by the transaction server computer system according to any predefined or adaptable rule-set. Accordingly, some or all the advantages described with respect to embodiments wherein the transaction server computer system is configured to issue requests for transactions between subsets of data may apply to embodiments wherein the transaction server computer system is configured to delete all subsets of data and create new subsets of data. The latter embodiments may have the possible advantage of reduced processing capacity and time consumption necessary in relation to varying the sub-balances of the subsets of data.

The transaction server computer system may be configured to issue requests for transfer of data representing an amount of monetary value to the first client's set of data, the number of requests and the amount of monetary value represented by the data requested to be transferred may be based on at least the balance of the set of data. In this case, the transaction server computer system may be able to vary the balance of the first client's set of data. Accordingly, the chance of the balance of the set of data reaching zero or near-zero balance may be reduced, which may increase the number of transactions the system is able to process per unit of time. The chance that the balance of the set of data becomes unnecessarily large may also be avoided. This may reduce any cost the first client may have in relation to making the amount of monetary value represented by the balance of the first client's set of data available to the system. The requests may be sent to some external set of data representing an external amount of monetary value. The external set of data may be stored by the first client itself or it may alternatively be stored by an administrative authority server computer system, which may be controlled by, e.g., a central bank.

The requests for transfer of data representing an amount of monetary value to the first client's set of data may be issued at predefined intervals in time, such as, e.g. once every day, 12 hours, 1 hour, 30 minutes, 15 minutes, 5 minutes, 30 seconds, etc.

According to embodiments, the computer network further comprises an administrative authority server computer system within which at least the first client has an account defining a real balance of monetary value, wherein the balance of monetary value represented by the set of data in the transaction server computer system mirrors the real balance of monetary value. In such embodiments the computer network comprises:

a plurality of first secure tunnels, each of which connects one of the clients to the transaction server computer system for passing the requests from the second clients to the transaction server computer system;

at least one second secure tunnel, which connects the transaction server computer system to the administrative authority server computer system for mirroring the real balance of monetary value at the administrative authority server computer system and the balance represented by the set of data at the transaction server computer system.

In addition to the transaction server computer system, embodiments of the system according to the present invention may thus comprise the administrative authority computer system. In such embodiments, the first client may have an account defining a real balance of monetary value within the administrative authority computer system, and this account may be mirrored on the first client's set of data stored in the transaction computer system. In the present context, mirroring the account on the set of data should be understood as comparing or equating the balance of real money defined by the account with the balance of monetary value represented by the set of data. Such mirroring may be carried out so that the balance of real money is equal to or at least as large as the monetary value represented by the set of data.

By performing the update in accordance with the requests for transactions at the mirrored set of data, latency delays caused by update of the real balance of the accounts of the monetary institutions at the administrative authority computer system may be reduced or avoided. Accordingly, by mirroring the real data and the set of data at the transaction server computer system, a further increase of transaction speed may be achieved. Update of the real balance may be performed intermittently, i.e. after a certain number of requests has been processed by the transaction server computer system, thus causing latency delays only of updates of the real balances which need to occur only at intervals of, e.g., six hours, one hour or 15 minutes. The intervals may also be defined by accumulated transaction amounts, the number of transactions carried out, etc.

Similarly, the first client's account in the administrative authority computer system may be mirrored on to the first client's set of data only at given intervals. Mirroring of the account on to the set of data should preferably be carried out in order to ensure that the real balance at the administrative authority server computer system adequately reflects the balance represented by the set of data, as updated according to the requests, at the transaction server computer system. As such, mirroring is preferably performed in relation with update of the real balance defined by the account. The step of mirroring may form part of the invention as claimed herein, or may be performed by a software component connected to the system according to the invention.

The plurality of first secure tunnels and the at least one second secure tunnel may comprise one or more secured data gateways such as firewalls. For instance, the system may comprise secured data gateways at each end of the secure tunnels. The first secure tunnels may also comprise means for data encryption. In this case, some or all of the requests sent through the secure tunnels may be encrypted to reduce the risk of request interception by unauthorized external clients. The secured tunnels may comprise a packet filtering module in which certain filter instructions are applied to all data packets transmitted through the secured tunnels. This may improve the possibilities of authorized requests being transmitted and accepting, while unauthorized requests are rejected. The secure tunnels may also be configured to send a message to the computer at the other end of the tunnel to redirect to a proxy server of the tunnel. In this case, the computer at the other end of the tunnel may send a token and the request for the resource the proxy server. If the token is valid, the request is forwarded through the secure tunnel, otherwise, the computer at the other end of the secured tunnel must first be authenticated. This may also improve the possibilities of authorized requests being transmitted and accepting, while unauthorized requests are rejected.

According to embodiments, the computer network further comprises an administrative authority server computer system within which at least the first client has an account defining a real balance of monetary value, wherein the balance of monetary value represented by the set of data in the transaction server computer system mirrors the real balance of monetary value; and wherein:
the first and second clients are configured to be administered by respective client administrators;
the administrative authority server computer system is configured to be administered by an authority administrator different from the client administrators, and
the transaction server computer system is configured to be administered by a trusted third party different from client administrators and the authority administrator;
and wherein the computer network comprises:
a plurality of first secure tunnels, each of which connects one of the clients to the transaction server computer system for passing the requests from the second clients to the transaction server computer system;
at least one second secure tunnel, which connects the transaction server computer system to the administrative authority server computer system for mirroring the real balance of monetary value at the administrative authority server computer system and the balance represented by the set of data at the transaction server computer system.

By having administrators administering the first and second clients, different from the administrators of the administrative authority server computer system, the risk of processing of fraudulent requests may be avoided or reduced. With the secure tunnels in place, processing of fraudulent requests may only be possible in the unlikely event that administrators of the computer networks at both ends of the secure tunnels contribute to the fraud. Similarly processing of fraudulent requests by the transaction server computer system and the clients may be reduced or avoided.

BRIEF DESCRIPTION OF THE DRAWINGS

Embodiments of the invention will now be described in further described with reference to the accompanying drawings, in which.

DETAILED DESCRIPTION OF THE DRAWINGS

It should be understood that the detailed description and specific example, while indicating an embodiment, are given by way of illustration only, since various changes and modifications within the spirit and scope of the invention will become apparent to those skilled in the art from this detailed description.

Figure 1:
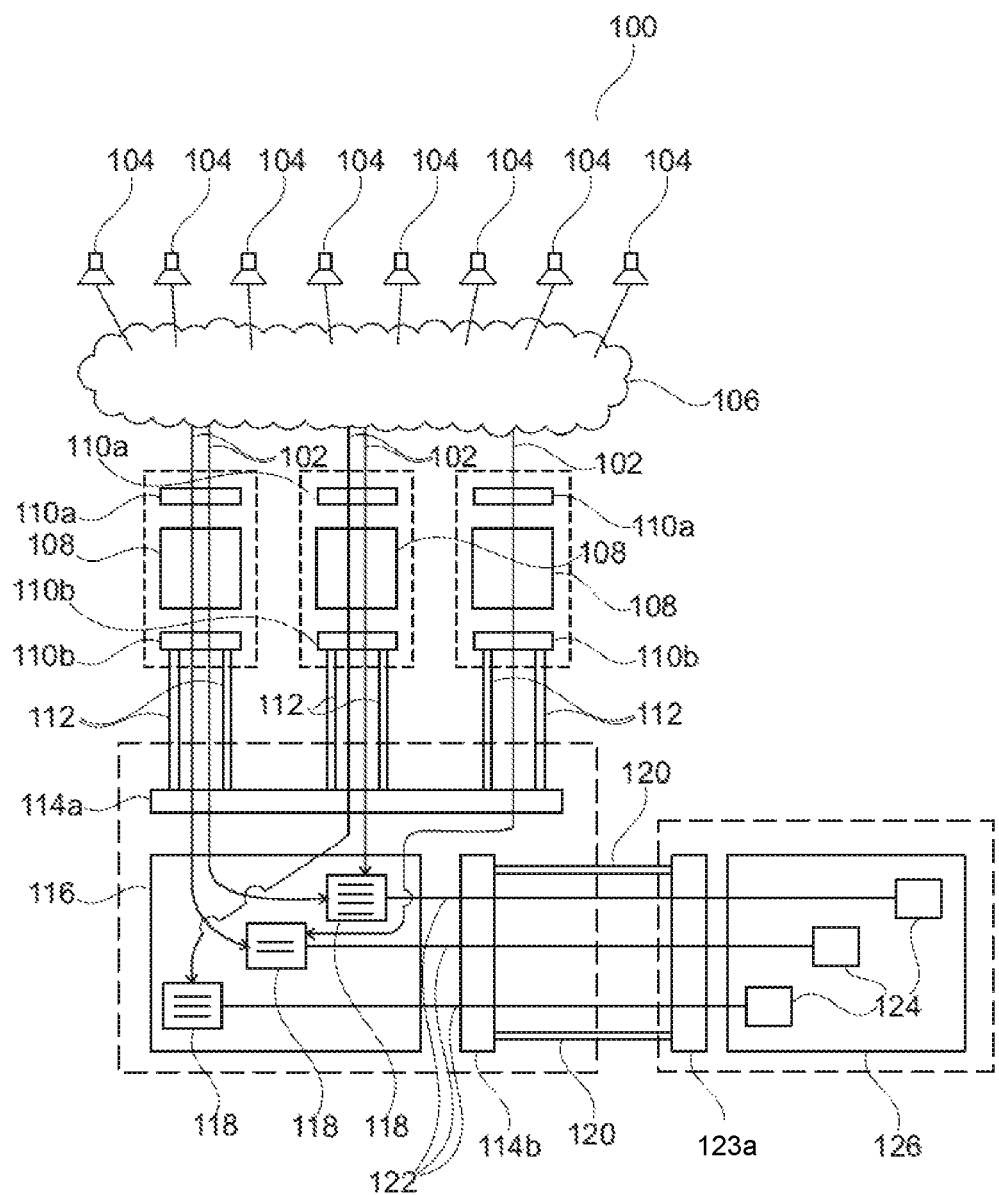
FIG. 1 illustrates an embodiment of a system for real-time transactions of data representing monetary value.

FIG. 1 illustrates a system 100 for real-time transactions of data representing monetary value between clients in a computer network. The transactions of data representing monetary value in the system cause transactions of monetary value. In present context, the term real-time transactions is to be understood as transactions being facilitated by the system in real-time as they are generated. Another common term for real-time transactions is instant payments.

In the embodiment illustrated in FIG. 1, requests 102 for transactions of data representing an amount of monetary value is generated by a multitude of agents by way of local computer systems 104. The requests are sent to a cloud 106, e.g. the internet, and from the cloud 106 to a plurality of second clients 108. Each second client has a firewall 110a that requests 102 from the cloud 106 passes through. The firewalls 110a improve the data security of the second clients and decrease the risk of fraudulent requests being transmitted from the cloud 106 to the second clients 108. From respective second clients 108, the requests 102 are forwarded through a data pathway comprising respective second client's firewall 110b, respective secure tunnels 112 and a firewall 114a at the other end of the secure tunnel 112, the firewall 114a being administered by the administrator of a server computer system 116. Each second client 108 and each second client's firewalls 110a and 110b are administered by the respective second client's administrator.

Upon receipt of the request 102, the server computer system 116 reserves and updates the first clients' sets of data 118 in accordance with the requests. Each second client's set of data 118 is divided into a plurality of subsets of data. The plurality of subsets of data are reserved and then updated simultaneously in response to receipt of a plurality of requests 102. It is achieved that a plurality of the requests 102 for update of the set of data 118 can be processed in parallel, i.e. at the same time. Thus, transaction speed is improved, and more updates per unit of time may thus be performed. In embodiments, a first processing unit processes receipt of the request 102 and instructs a second processing unit reserves and updates the subsets of data simultaneously. This further allows processing of requests to be handled in parallel with an increase in transaction speed and hardware utilisation as a result.

The update of the first client's set of data 118 may in particular reside in drawing of monetary value from the first client's set of data 118 to reduce the balance of monetary value represented thereby. For example, the request 102 for a transaction may reside in a request 102 from one of the second clients 108 to transfer or wire an amount of monetary value from the first client's set of data to a further set of data representing a monetary balance of the requesting second client 108. In one embodiment of the invention, each request 102 for transactions is compared to the balance of each subset of data to ensure that the amount of monetary value to be drawn does not exceed the sub-balance of the subset of the set of data to which the request in question is designated. Alternatively or additionally, the transaction server computer system 116 may be configured to decline a request in case the amount to be drawn exceeds the available balance of the first client's set of data 118.

The administrator of the server computer system 116 also administers the firewalls 114a and 114b associated with the server computer system 116.

The transaction server computer system 116 is configured to issue requests 122 for transfer of data representing an amount of monetary value to the first client's set of data 118. The number of requests 122 and the amount of monetary value represented by the data requested to be transferred may be based on at least the balance of the set of data. Accordingly, the transaction server computer system 116 is able to vary the balance of the first client's set of data 118.

The chance of the balance of the set of data reaching zero or near-zero balance is then reduced, which increases the number of transactions the system 100 is able to process per unit of time. The chance that the balance of the set of data becomes unnecessarily large may also be avoided. This may reduce any cost the first client may have in relation to making the amount of monetary value represented by the balance of the first client's set of data available to the system 100. The requests 122 are sent from the server computer system 116 through a data pathway comprising a firewall 114b, a secured tunnel 120 and a firewall 123a. The requests 122 are sent to respective first clients' account 124 representing an amount of monetary value. The accounts 124 are stored by an administrative authority server computer system 126, which may be controlled by, e.g., a central bank. The administrator of the administrative authority server computer system 126 also administers the firewall 123a associated with the administrative authority server computer system 126.

The first client's account 124 defines a real balance of monetary value within the administrative authority computer system 126, and this account 124 is mirrored on the first client's set of data 118 stored in the transaction computer system 116. In the present context, mirroring the account 126 on the set of data 118 is carried out so that the balance of real money is equal to or at least as large as the monetary value represented by the set of data 118.

The requests 122 for transfer of data representing an amount of monetary value to the first client's set of data 118 are issued at predefined intervals in time, such as, e.g. once every day, 12 hours, 1 hour, 30 minutes, 15 minutes, 5 minutes, 30 seconds, etc.

By having administrators administering the first and second clients, different from the administrators of the administrative authority server computer system 126, the risk of processing of fraudulent requests may be avoided or reduced. With the secure tunnel 120 in place, processing of fraudulent requests may only be possible in the unlikely event that administrators of the computer networks at both ends of the secure tunnel 120 contribute to the fraud. Similarly processing of fraudulent requests by the transaction server computer system 116 and the second clients 108 may be reduced or avoided.

Figure 2:
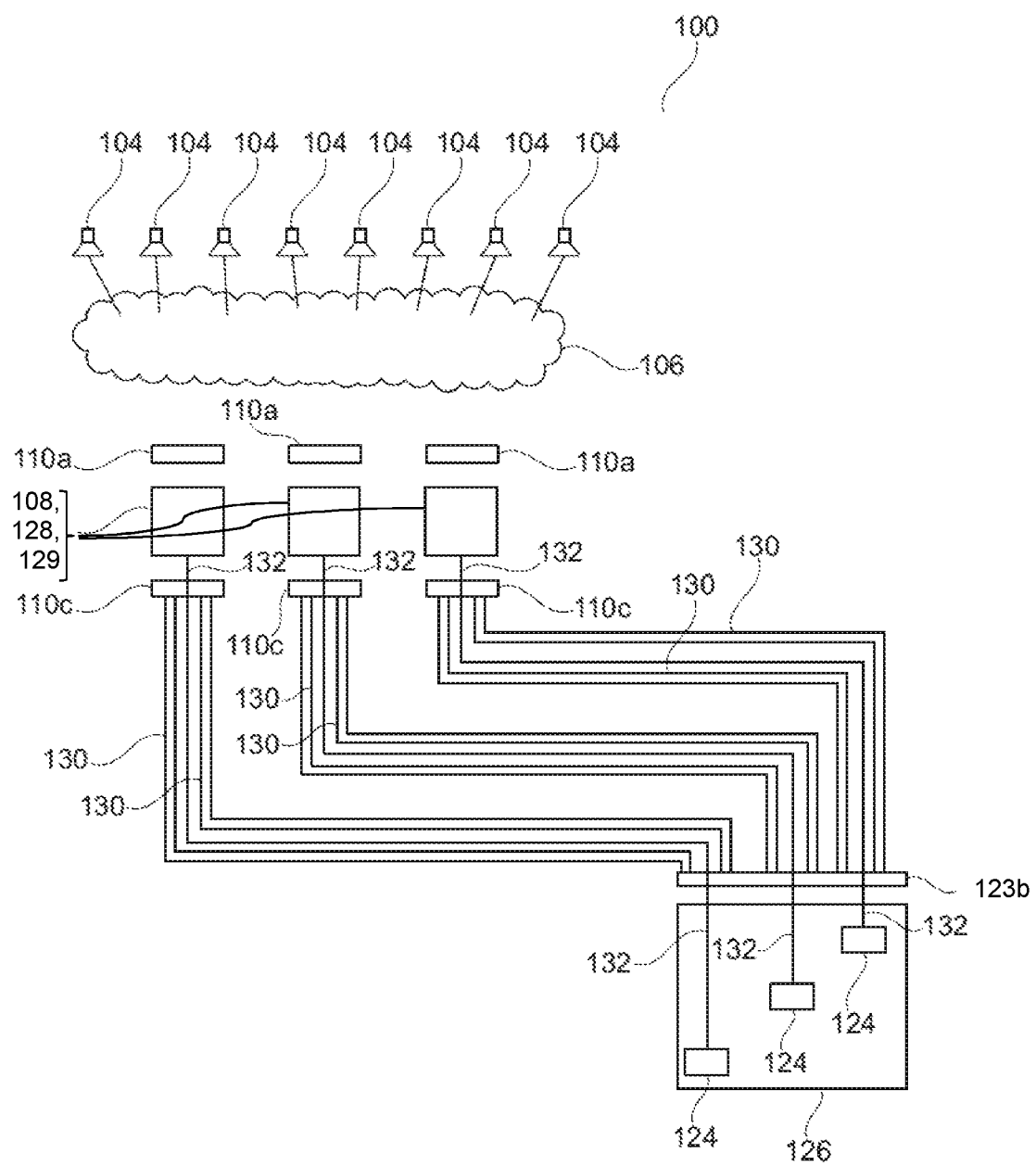
FIG. 2 illustrates an embodiment of a system for real-time transactions of data representing monetary value.

For the purpose of illustrating the relationship between the clients, these are exemplified in the embodiment of FIG. 2. In this embodiment, the clients are in the form of monetary institutions and in response to a first request, a first monetary institution acts as a first client and a second monetary institution acts as a second client. Whereas in response to a second request, the first monetary institution acts as a second client and the second monetary institution acts as a first client. That is, requests for transactions may be exchanged between all monetary institutions in the system.

In the embodiment illustrated in FIG. 2, the monetary institutions 128 are able to act as both first clients 129 and second clients 108. As such, FIG. 2 illustrates a data communication pathway between the administrative authority server computer system 126 and the monetary institutions 128. As discussed with reference to FIG. 1, the transaction server computer system 116 is configured to issue requests 122 for transfer of data representing an amount of monetary value to the first client's set of data 118 at predefined intervals in time, and this may be done in relation to mirroring of the first client's set of data 118 and the first client's account 124.

After the requests 122 for transfer of data representing an amount of monetary value to the first client's set of data 118 are issued, the real balances of the accounts 124 are updated. Through a firewall 123b, respective secure tunnels 130 and firewalls 110c of the monetary institutions 128, requests 132 for update of the real balances of money represented by the first clients' accounts 124 are sent to the monetary institutions 128 acting as first clients 129. The data pathways for the requests 122 comprising firewalls 110c and 123b and secure tunnels 130 are not linked to the transaction server computer system.

Figure 3:
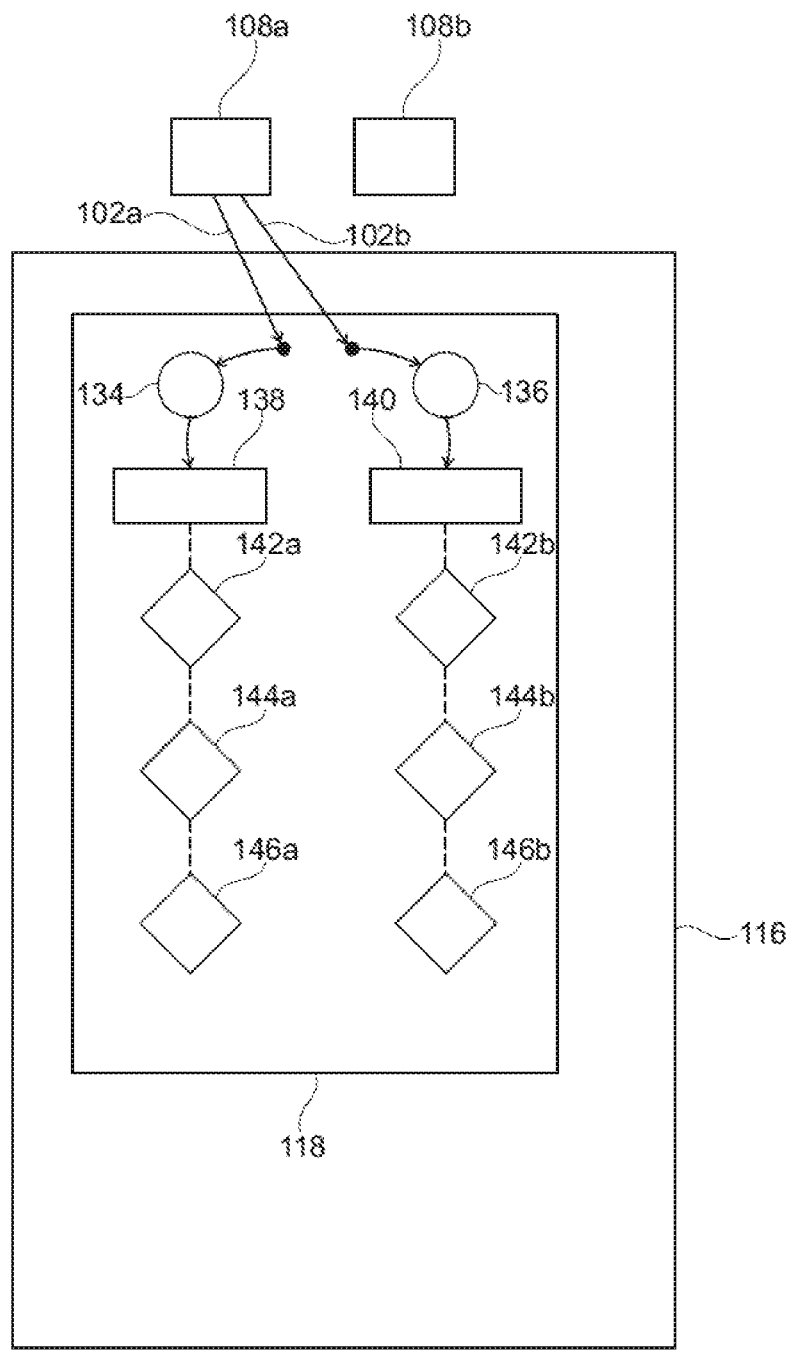
FIG. 3-5 illustrate flow charts of real-time transactions according to embodiments.
Figure 4:
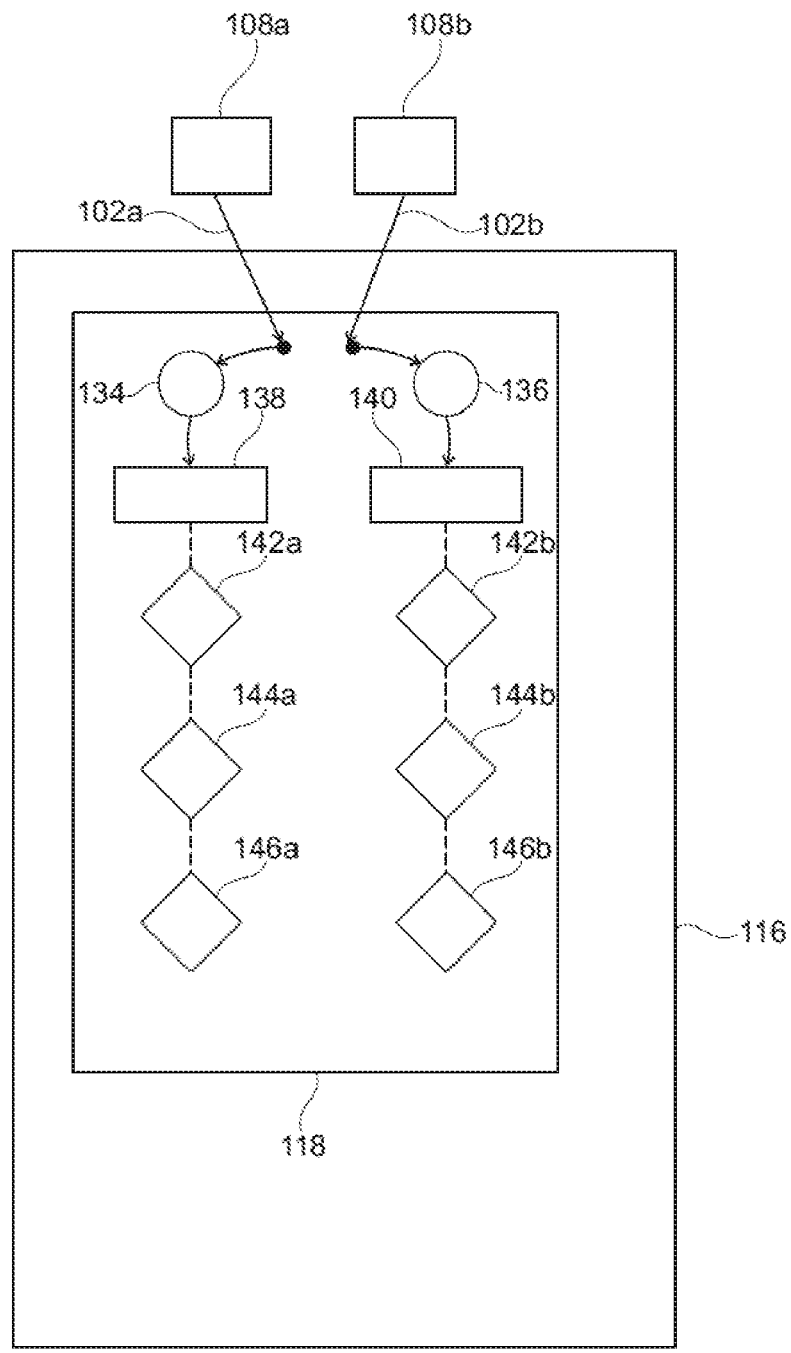
Figure 5:
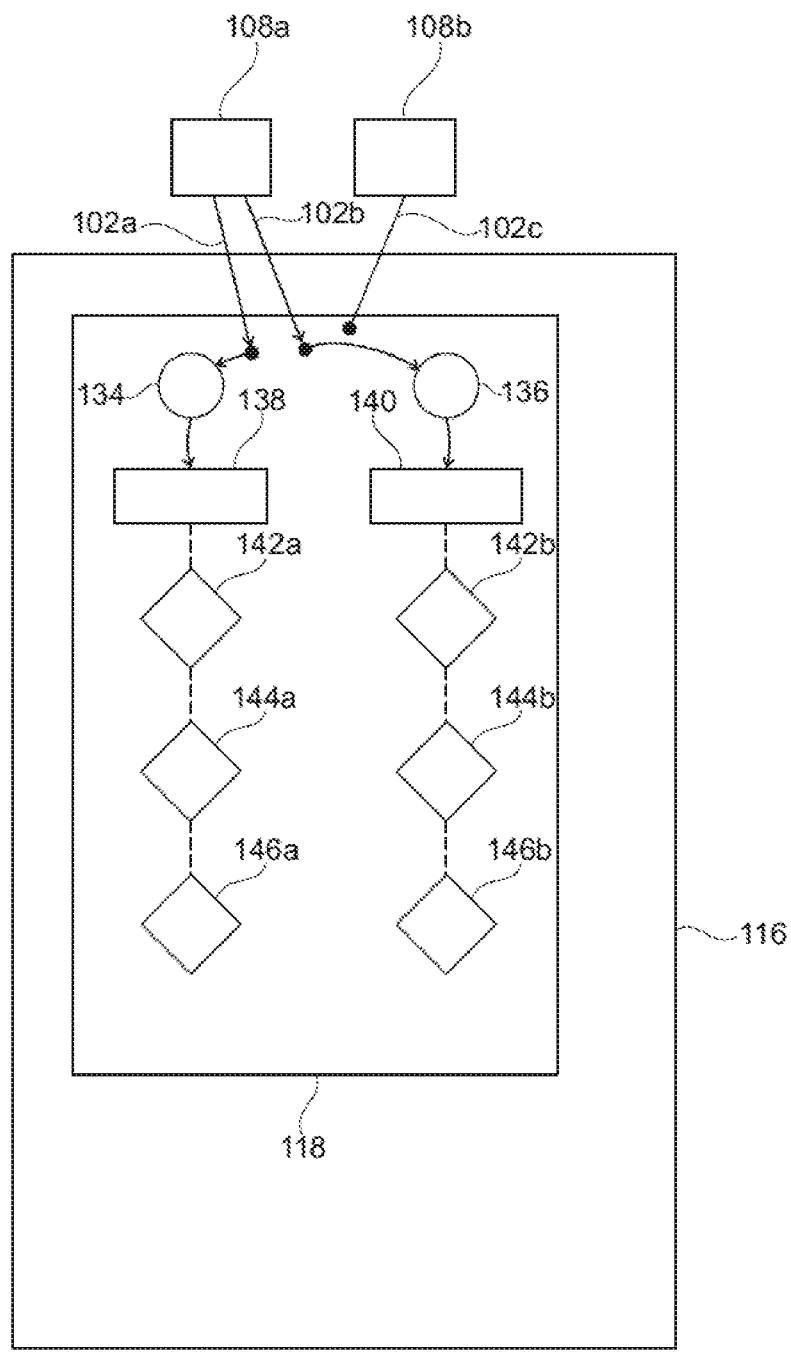

FIGS. 3-5 illustrate flow-charts of the process of updating the first client's set of data 118 stored in a data structure of the transaction server computer system 116. The set of data 118 is divided into a first subset of data 134 and a second subset of data 136. In FIG. 3 and FIG. 4 a first request 102a and a second request 102 for update of the first client's set of data 118 are received simultaneously. In FIG. 3 the two requests 102a and 102b are received from the same second client 108a, whereas in FIG. 4 the first request 102a is received from a first second 108a and the second request 102b is received from a second client 108b. The first request 102a is forwarded 134 to the first subset of data 138, while the second request 102b is forwarded 136 to the second subset of data 140. The respective subsets of data 138 and 140 are then reserved in step 142a and 142b for respective requests 102a and 102b. In steps 144a and 144b the subsets of data 138 and 140 are updated simultaneously. Finally, the subsets of data 138 and 140 are released in step 146a and 146b. The released subsets of data are available for further updates and the process of reserving 142a, 142b and updating 144a, 142b the subsets of data 138 and 140 may be repeated in response to further requests.

In FIG. 5 a third request 102c for update of the first client's set of data 118 is received from the second client 108b while both subsets of data 138 and 140 are reserved for processing of the first request 102a and the second request 102b. In this case, the set of data 118 is updated according to a predefined auxiliary updating scheme in response to receipt of the third request 102c. The predefined auxiliary updating scheme is to store the third request 102c and to determine if the first and second subsets of data 138 and 140 are reserved at predefined intervals in time. The predefined intervals in time may be on, e.g. the microsecond scale, millisecond scale or second scale. The transaction server computer system 116 may then continue to determine if the first and second subsets of data 138 and 140 are reserved until at least one of the first and second subsets of data 138 and 140 is released. At this point, the released subset of data is reserved for the third request 102c.

Figure 6:
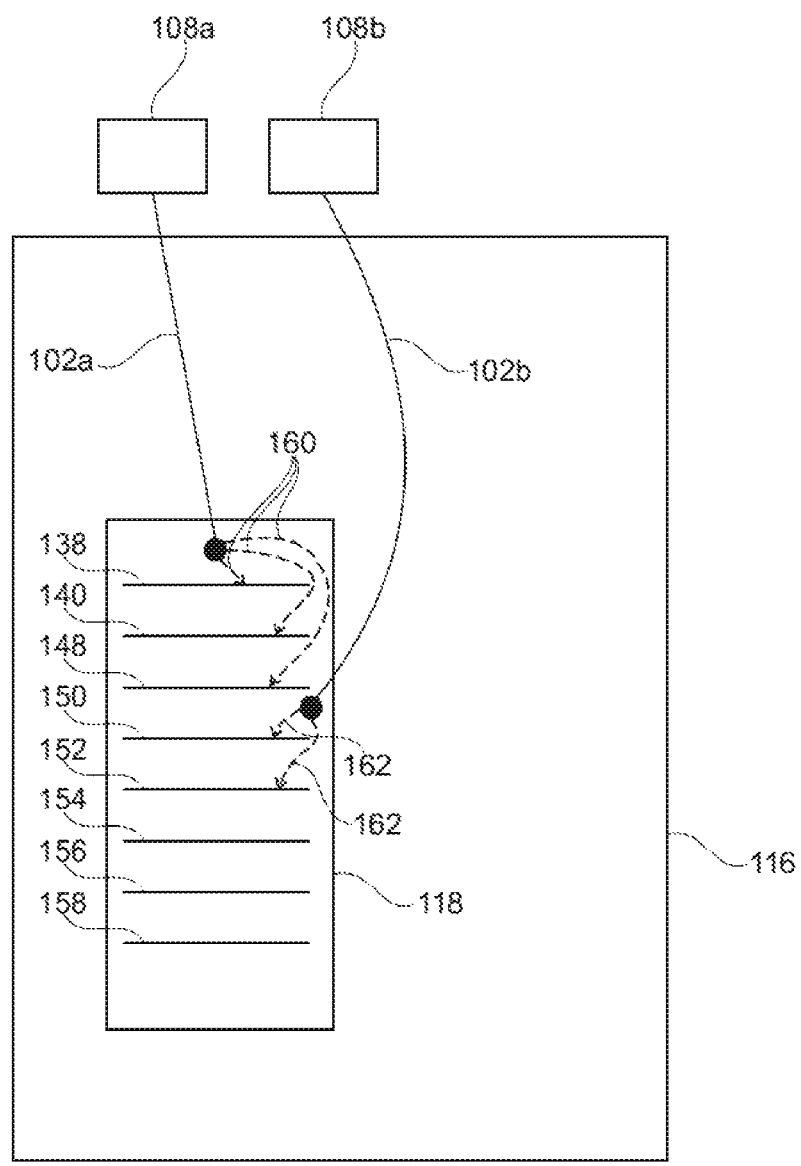
FIG. 6-7 illustrate systems according to embodiments.

FIG. 6 illustrates a system wherein the transaction server computer system 116 stores the first client's set of data 118 in a data structure comprising eight subsets of data 138, 140, 148-158. In response to receipt of the first request 102a, the transaction server computer system 116 simultaneously reserve three subsets of data 138, 140 and 148 defining sub-balances large enough for the accumulated sub-balances of the reserved subsets of data 138, 140 and 148 to be at least as large as the amount of monetary value represented by the data requested to be transferred by the first request 102a. The transaction server computer system 116 then divides the first request 102a into a first set of sub-requests 160 with three sub-requests and updates the three subsets of data 138, 140 and 148 in accordance with the first set of sub-requests 160. Accordingly, in response to receipt of the second request 102b, the transaction server computer system 116 generates a second set of sub-requests 162 with two sub-requests and reserves and updates the fourth and fifth subsets of data 150 and 152 in accordance with the second set of sub-requests 162. The transaction server computer system 116 could also reserve and update, e.g. the second subset of data 140, the fifth subset of data 152 and the seventh subset of data 158 in accordance with the first set of sub-request 160, while reserving and updating other subsets of data in accordance with the second set of sub-requests. Moreover, the transaction server computer system 116 may reserve and update any combination of subsets of data in accordance with any set of sub-requests as long as the set of sub-requests and the combination of subsets of data conforms to the rules laid out just above for the transaction server computer system 116.

Figure 7:
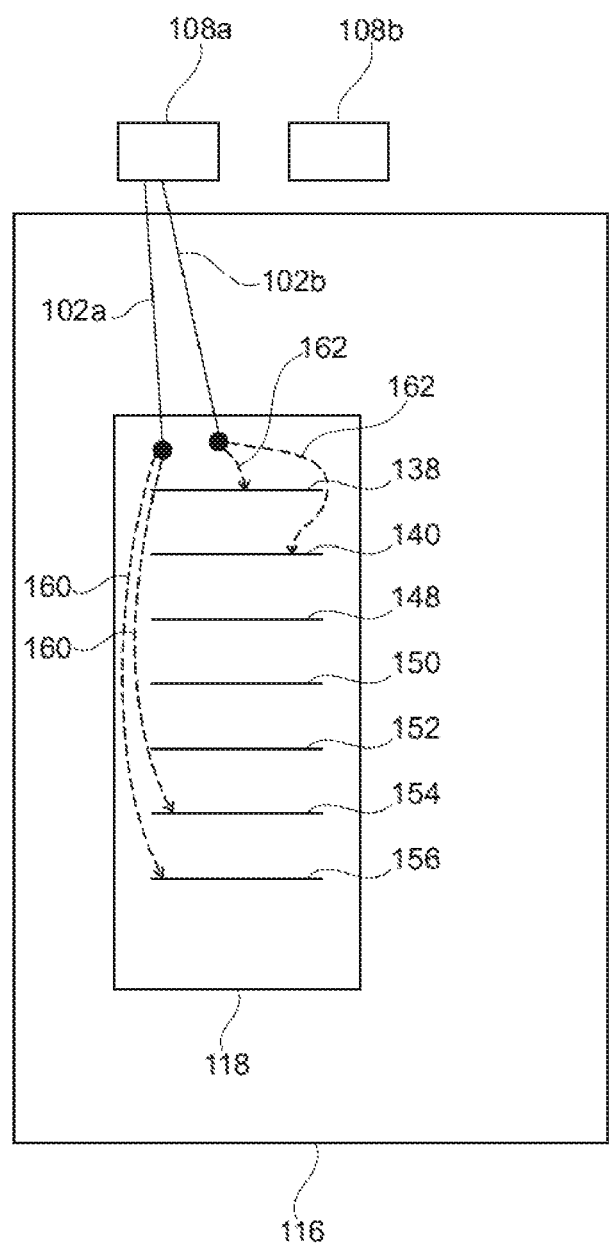

FIG. 7 illustrates a system 100 wherein the transaction server computer system 116 is configured to generate and populate a prioritized list of seven subsets of data 138, 140, 148-156. In the embodiments of FIG. 7 the prioritized list is generated and populated with subsets of data with increasingly large balances so that the first subset of data 138 represents a balance of monetary units smaller than the balance of the second subset of data 140. The balance of the second subset of data 140 is smaller than the balance of the third subset of data 148, and so forth. A first request 102a for transaction of data representing a relatively large amount of monetary unit is forwarded to the set of data 118. The transaction server computer system 116 then divides the first request 102a into a first set of sub-requests 160. The transaction server computer system 116 then reserves and updates the sixth and seventh subsets of data 154 and 156 in accordance with the first set of sub-requests 160. Accordingly, in response to receipt of a second request 102b for transaction of data representing a relatively small amount of monetary units, the transaction server computer system 116 reserves and updates the first and second subsets of data 138 and 140.

In the system 100 illustrated in FIG. 7, the transaction server computer system 116 is then able to preferentially reserve the subsets of data with the largest sub-balances in response to receipt of the first request 102a for transaction of data representing a first amount of monetary value which is larger than a second amount of monetary value of the second request 102b. Conversely, the transaction server computer system 116 is also able to preferentially reserve the subsets of data with the smallest sub-balances of the subsets of data 138, 140, 148-156 in response to receipt of the second request 102b for transaction of data representing the second amount of monetary value which is smaller than the first amount of monetary value of the first request 102a.

Figure 8:
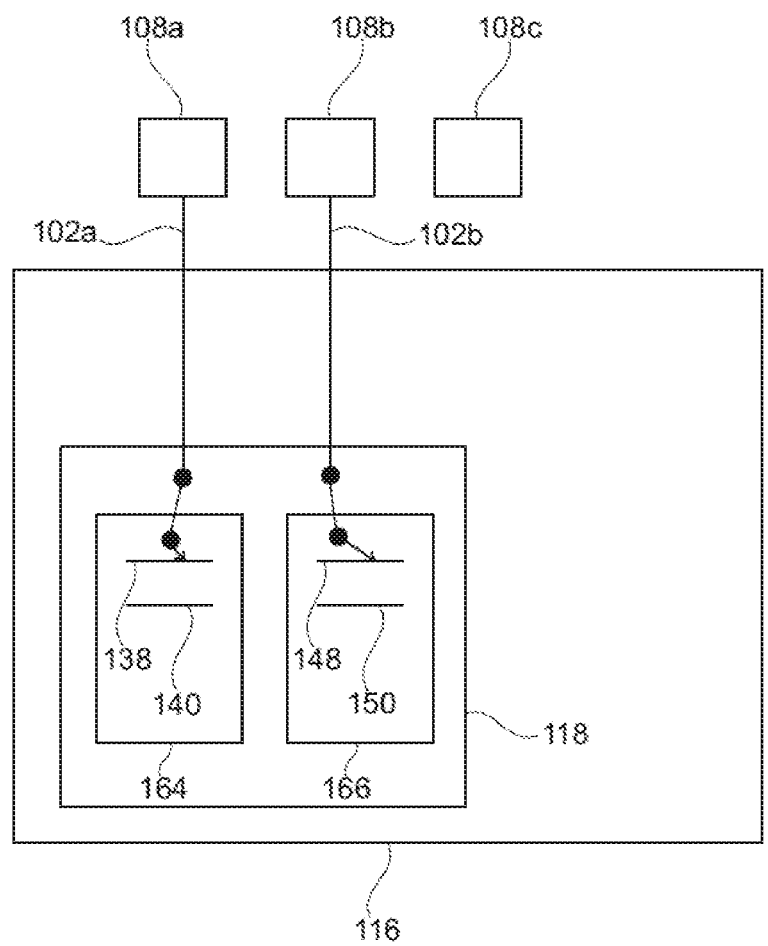
FIG. 8-10 illustrate systems according to embodiments.
Figure 9:
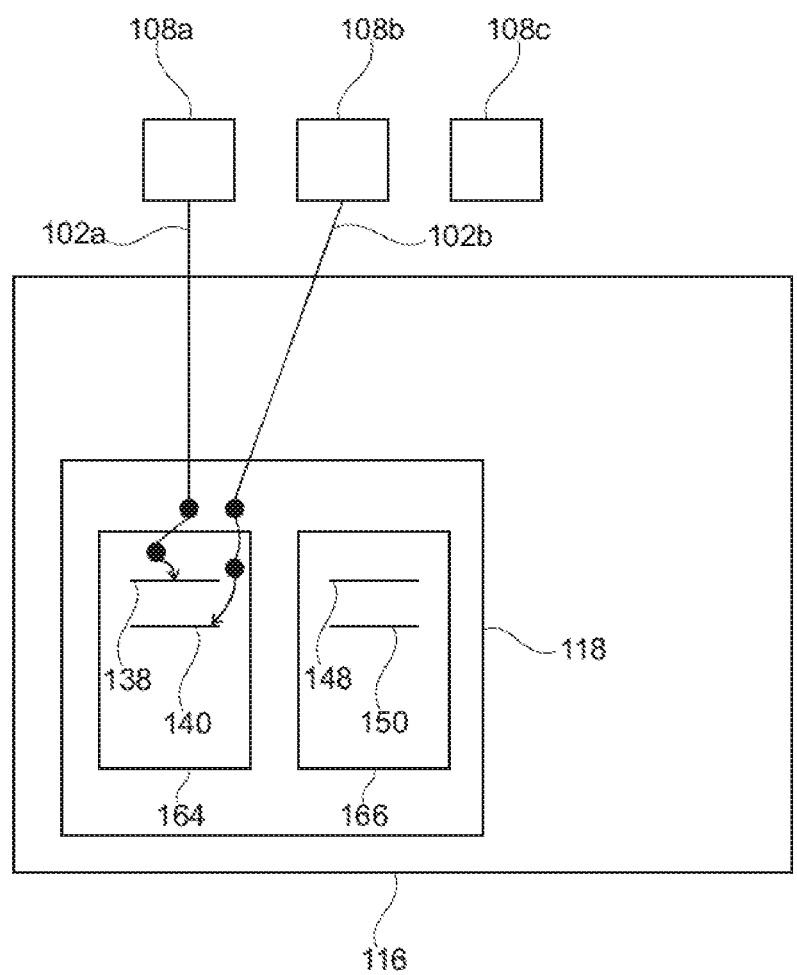
Figure 10:
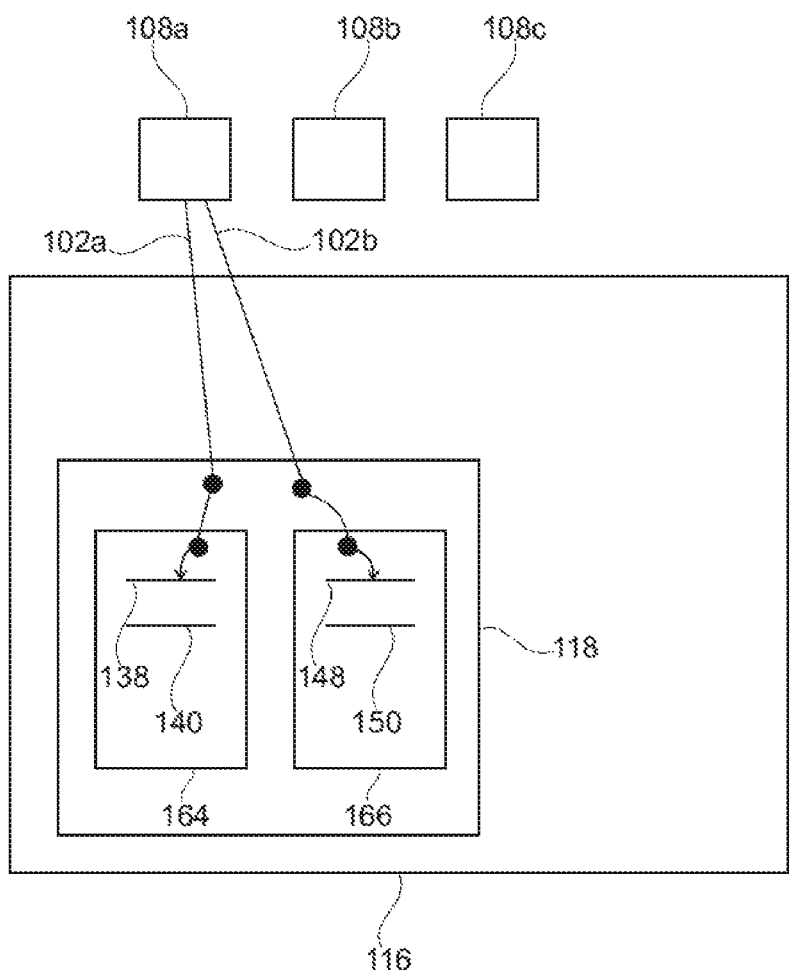

FIGS. 8-10 illustrate systems 100 wherein the transaction server computer system 116 stores the subsets of data 138, 140, 148 and 150 associated with the first client on two different server computers 164 and 166. In these embodiments, the first and second subsets 138 and 140 are stored on a first server computer 164 and third and fourth subsets of data 148 and 150 are stored on a second server computer 166. In embodiments, the transaction server computer system 116 comprises a second processing unit, which in turn comprises multiple CPUs. In one embodiment, the first server computer 164 comprises a first CPU handling reservation and update of the first and second subsets 138 and 140, and the second server computer 166 comprises a second CPU handling reservation and update of the third and fourth subsets of data 148 and 150.

In FIG. 8 the first request 102a is received from the first second client 108a and forwarded to the first server computer 164 and the first subset of data 138 is reserved and updated in accordance with the first request 102a. The second request 102b is received from the second client 102b and forwarded to the second server computer 166 and the third subset of data 148 is reserved and updated accordance with the second request 102b.

In FIG. 9 the first request 102a is received from the first second client 108a and forwarded to the first server computer 164 and the first subset of data 138 is reserved and updated in accordance with the first request 102a. The second request 102b is received from the second client 102b and forwarded to the first server computer 164 and the second subset of data 148 is reserved and updated accordance with the second request 102b.

In FIG. 10 the first and second requests 102a and 102b are received from the first second client 108a. The first request 102a is forwarded to the first server computer 164 and the first subset of data 138 is reserved and updated in accordance with the first request 102a. The second request 102b is forwarded to the second server computer 166 and the third subset of data 148 is reserved and updated accordance with the second request 102b.

The systems 100 embodied in FIGS. 8-10 may be configured to a request into a set of a plurality of sub-requests 160. In this case, no set of sub-requests 160 is processed on more than one server computer.

Example I

In order to ascertain the effect of the invention with regard to the number of updates or transactions per unit time, the following tests were performed:
1. One first client receiving requests for update of its set of data, the set of data not being divided into subsets of data;
2. 16 clients that are acting as first and second clients sending and receiving requests for updates of respective sets of data, each client's set of data not being divided into subsets of data; and
3. 16 clients that are acting as first and second clients sending and receiving requests for updates of respective sets of data, each client's set of data being divided into 8 subsets of data.

Accordingly, the configurations of test 1 and test 2 are not embodiments of the present invention. Test 3 was performed in a test environment emulating a system for facilitating real-time transactions according to an embodiment of the invention. All tests are performed on the same computer system with the same hardware configuration for each test.

The raw data of all three tests are reported in Table 1 below. The column 'No. of Part.' denotes the number of clients, wherein each client may act as both a first and second client. The column 'Slices' denotes the number of subsets of data each second client's set of data is divided into. 'Count' is the total number of updates of second clients' sets of data, which corresponds to transactions of monetary value as described above. The 'Duration' is measured in seconds and the 'Throughput' is measured in updates, i.e. transactions per second [tx/s].

TABLE 1

| Test Case | No. of Part. | Slices | Count | Duration | Throughput |
|---|---|---|---|---|---|
| #1 | 1 | 1 | 2520 | 17.129 s | 147 tx/s |
| #2 | 16 | 1 | 2512 | 31.724 s | 79 tx/s |
| #3 | 16 | 8 | 2512 | 12.170 s | 206 tx/s |

From the results of Table 1, it is seen that as the number of clients was increased without dividing sets of data into subsets of data, the number of updates per second was significantly decreased, likely due to bottleneck formation caused by reserved and thus unavailable sets of data.

Further, it is seen that with the same number of clients (16) and updates of a plurality of subsets of data (8) in accordance with embodiments of the invention, the number of updates per second more than doubled. Accordingly, thanks to the implementation of a system according to embodiments of the invention a significant increase in transaction speed was achieved.

Notably, the increase in transaction speed was achieved without changing the computer hardware configuration of the system for transactions. This has several tangible effects in the physical world outside the bits and bytes of the computer system. Firstly, embodiments of the invention can handle the same number of transactions as systems known in the art, but with significantly less computing power. Accordingly, embodiments of the present invention decreases the demand on hardware. Further, by recording the CPU load during the tests, it is seen that the energy consumption for handling the same number of transaction was significantly lower in test 3 than in test 2 due to the more efficient handling of the requests and updates. Accordingly, embodiments of present invention optimise energy consumption further reducing the demand on resources.

Finally it is noted that although the reported test was performed with 8 subsets of data for each first client, the overall trends of results would be readily appreciated by a person skilled in the art to apply in systems with down to two subsets of data for each first client.

The invention claimed is:
1. A system for facilitating real-time transactions of data representing monetary value between clients in a computer network, the system comprising:
  at least one first client; and
  a transaction server computer system,
  the first client being associated with a set of data representing a balance of monetary value, the set of data being stored in the transaction server computer system,
  wherein the transaction server computer system is configured for receiving requests for transactions of data representing an amount of monetary value, via the computer network, from a plurality of second clients for real-time updates of the first client's set of data, and
  wherein the transaction server computer system includes a processor and a memory having stored thereon executable instructions that when executed by the processor configure the transaction server computer system to perform at least the following
    store the first client's set of data in a data structure, wherein the data structure comprises at least a first subset of the first client's set of data and a second subset of the first client's set of data, each subset of data defining a sub-balance representing an amount of monetary value;
    reserve each of the first and second subsets of data for a respective first and second one of the requests upon receipt of the requests;
    update the first subset of data in accordance with the first request, and simultaneously update the second subset of data in accordance with the second request,
  wherein the transaction server computer system comprises:
    a first processing unit for processing receipt of the requests for transactions; and
    a second processing unit for reserving each of the first and second subsets of data for the respective first and second ones of the requests upon receipt of the requests, and for updating the first subset of data in accordance with the first request, and for simultaneously updating the second subset of data in accordance with the second request;

wherein the first processing unit is further configured to instruct the second processing unit to store the first client's set of data in the data structure, reserve each of the first and second subsets of data for the respective first and second ones of the requests upon receipt of the requests, and to update the first subset of data in accordance with the first request, and to simultaneously update the second subset of data in accordance with the second request, wherein the second processing unit is a parallel processing unit comprising multiple cores in a single CPU or multiple CPUs, and wherein the transaction server computer system is configured to change the number of subsets of data based on an evaluation of the number of received requests within a specified period of time.

2. The system according to claim 1, wherein each of the subsets of data is processed at a dedicated one of the CPUs or CPU cores of the parallel processing unit, so that each subset of data is processed by one of the CPUs or CPU cores different from any other one of the CPUs or CPU cores.

3. The system according to claim 1, wherein the transaction server computer system is configured to determine, upon receipt of a third one of the requests, if the first and second subsets of data are reserved, and in the affirmative, perform an update of the set of data according to a predefined auxiliary updating scheme.

4. The system according to claim 1, wherein the transaction server computer system is configured to:
   determine, upon reservation of the first or second subset of data for one of the requests, if an envisaged update of the reserved subset of data in response to that request would cause the sub-balance of the reserved subset of data to become negative;
   if it is determined that the sub-balance of the reserved subset of data would become negative: divide the request into a first set of a plurality of sub-requests, reserve the second subset of data, and update the first and second subsets of data simultaneously in accordance with the plurality of sub-requests.

5. The system according to claim 1, wherein the transaction server computer system is configured to:
   determine the sub-balances of a plurality of subsets of data in response to receipt of one of the requests;
   simultaneously reserve a number of subsets of data large defining sub-balances enough for the accumulated sub-balances of the reserved subsets of data to be at least as large as the amount of monetary value represented by the data requested to be transferred;
   divide the request into a second set of sub-requests, the number of sub-requests in the second set of sub-requests being equal to the number of reserved subsets of data;
   update the reserved subsets of data simultaneously in accordance with the second set of sub-requests.

6. The system according to claim 1, wherein the transaction server computer system comprises a plurality of individual data storage units, and wherein each subset of data is stored in an individual data storage unit.

7. The system according to claim 1, wherein the transaction server computer system comprises a plurality of server computers, and wherein all data associated with the first client is stored in a single server computer.

8. The system according to claim 7, wherein a single server computer stores data associated with the first client only.

9. The system according to claim 1, wherein subsets of data associated with the first client are stored on at least two server computers, and wherein no set of sub-requests is processed on more than one server computer.

10. The system according to claim 1, wherein the transaction server computer system is configured to determine the sub-balances of all subsets of data at predefined intervals in time.

11. The system according to claim 1, wherein the computer network further comprises an administrative authority server computer system within which at least the first client has an account defining a real balance of monetary value, wherein the balance of monetary value represented by the set of data in the transaction server computer system mirrors the real balance of monetary value; and wherein the computer network comprises:
   a plurality of first secure tunnels, each of which connects one of the clients to the transaction server computer system for passing the requests from the second clients to the transaction server computer system;
   at least one second secure tunnel, which connects the transaction server computer system to the administrative authority server computer system for mirroring the real balance of monetary value at the administrative authority server computer system and the balance represented by the set of data at the transaction server computer system.

12. A system for facilitating real-time transactions of data representing monetary value between clients in a computer network, the system comprising:
   at least one first client, and
   a transaction server computer system,
   the first client being associated with a set of data representing a balance of monetary value, the set of data being stored in the transaction server computer system,
   wherein the transaction server computer system is configured for receiving requests for transactions of data representing an amount of monetary value, via the computer network, from a plurality of second clients for real-time updates of the first client's set of data, and
   wherein the transaction server computer system includes a processor and a memory having stored thereon executable instructions that when executed by the processor configure the transaction server computer system to perform at least the following
   store the first client's set of data in a data structure, wherein the data structure comprises at least a first subset of the first client's set of data and a second subset of the first client's set of data, each subset of data defining a sub-balance representing an amount of monetary value;
   reserve each of the first and second subsets of data for a respective first and second one of the requests upon receipt of the requests;
   update the first subset of data in accordance with the first request, and simultaneously update the second subset of data in accordance with the second request,
   wherein the transaction server computer system comprises:
      a first processing unit for processing receipt of the requests for transactions; and
      a second processing unit for reserving each of the first and second subsets of data for the respective first and second ones of the requests upon receipt of the requests, and for updating the first subset of data in accordance with the first request, and for simultaneously updating the second subset of data in accordance with the second request;

wherein the first processing unit is further configured to instruct the second processing unit to store the first client's set of data in the data structure, reserve each of the first and second subsets of data for the respective first and second ones of the requests upon receipt of the requests, and to update the first subset of data in accordance with the first request, and to simultaneously update the second subset of data in accordance with the second request, wherein the second processing unit is a parallel processing unit comprising multiple cores in a single CPU or multiple CPUs, and wherein the transaction server computer system is configured to:
- determine the sub-balances of each of the plurality of subsets of data at predetermined intervals
- generate and populate a prioritized list of the subsets of data, wherein the prioritized list ranks the subsets or groups of the subsets according to their associated sub-balances;
- select one of the subsets or groups of subsets in the prioritized list for each one of the requests on the basis of the prioritized list;
- assign each of the requests to the selected subset or groups of subsets; and subsequently
- update at least one of the subsets of data of the selected subset or groups of the subsets in accordance with each one of the requests.

* * * * *